3,054,819
PREPARATION OF ORGANIC ISOCYANATES
Robert Barclay, Jr., and Raymond P. Kurkjy, New Brunswick, N.J., assignors to Union Carbide Corporation, a corporation of New York
No Drawing. Filed Aug. 29, 1958, Ser. No. 757,907
8 Claims. (Cl. 260—453)

This invention relates to a method for preparing organic isocyanates and, more particularly, to a method for preparing organic isocyanates employing ethylene carbonate as the starting material.

Heretofore, organic isocyanates have been produced by the reaction of phosgene and an amine in an inert organic solvent such as chlorobenzene, toluene, or xylene. The intermediate reaction product is treated with additional phosgene to form a crude isocyanate product corresponding to the amine. After removal of the unreacted phosgene and the hydrogen chloride from the crude reaction product, the isocyanate is obtained by distilling off the solvent. A variation of this method uses an amine hydrochloride, either with or without a boron trifluoride catalyst. It is also known to react phosgene with amines to give carbamic acid chlorides which are treated with a basic compound to remove hydrogen chloride to obtain the isocyanate.

These methods enjoy considerable commercial success but are disadvantageous in many respects, primary among which is their use of phosgene and their production of HCl. Phosgene is toxicologically hazardous, either nascent or as a gas, and is of necessity used in great excess in these reactions. In addition, in these reactions HCl is present in the equipment at high temperatures. The cost of corrosion resistant equipment and the necessarily frequent replacement of parts is a serious economic drawback to the use of these reactions.

Methods have been proposed which eliminate the use of phosgene, but none have found the commercial acceptance accorded the phosgene reaction because of the cost of starting materials, unusual reaction conditions required, poor yields, and the unpredictability of reaction results caused by a number of side reactions. For example, the reaction of a metal azide and an acid halide produces an acid azide which when heated in an inert solvent decomposes, yielding an isocyanate. The thermal decomposition of even low molecular weight acid azides is quite hazardous, and close control of the amount of solvent present and of the decomposition rate itself is required. For these reasons the use of acid azides is not commercially practicable or especially desirable.

Still another method prepares isocyanates by pyrolyzing an N-alkyl, N-alkoxyalkyl, or N-alkoxyalkoxyalkyl carbamate in the presence of a basic catalyst, thereafter separating the isocyanic ester from the pyrolysis products before the carbamate is reformed. The preparation of all these carbamates, however, requires the use of phosgene. Thus, for example, an alcohol can be reacted with phosgene to obtain the alkyl chloroformate which is, in turn, reacted with an amine to yield the desired urethane. Alternatively, the amine can be reacted directly with phosgene and the carbamic acid chloride obtained reacted with an alcohol to yield the urethane. The use of these procedures, while enabling the production of urethanes at comparatively low temperatures and thereby lessening to some degree the corrosive effects of the HCl, does not avoid the corrosion problem entirely and the toxicological difficulties inherent in the use of phosgene remain.

In our copending application Serial No. 757,913, filed August 29, 1958, there is disclosed an improved process by which isocyanates are produced without the use of phosgene. In that invention it was found that by pyrolyzing hydroxyurethanes under certain pressures, generally subatmosphere, and at temperatures of about 100° C. to about 300° C. that isocyanates of good purity are secured in respectable yields. While this method is advantageous in many instances, it is somewhat limited in commercial appeal because of by-product formation. In the pyrolysis reaction for instance, the hydroxyurethane is in part reconverted back to the amine and ethylene carbonate from which the hydroxyurethane is prepared, and the amine thus prepared reacts with some of the isocyanate produced to irreversibly form a urea. This urea formation reduces the yield of the isocyanate produced.

In addition, the process of the pyrolysis of hydroxyurethanes of this copending application is limited to only the preparation of monoisocyanates.

Attempts to produce a diisocyanate from bis(hydroxyurethanes) have been unsuccessful due to the formation of a polyurethane according to the reaction $$HO-CH_2CH_2-O-\overset{O}{\underset{\|}{C}}-NH-R-NH-\overset{O}{\underset{\|}{C}}-O-CH_2CH_2OH$$
$$\downarrow$$

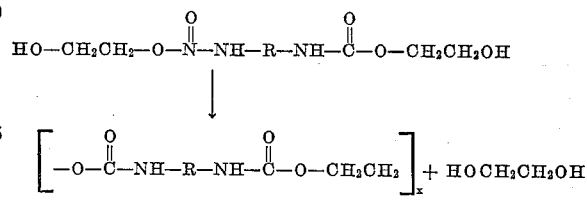 $+ HOCH_2CH_2OH$

Dissociation of the polymer leads to formation of a polyurea and yields no diisocyanate.

It is therefore a specific object of the present invention to provide a process which can be used not only to produce monoisocyanates in high yield and purity without serious by-product formation, but which can also be employed to prepare diisocyanates in good yields and purity.

It is a further object of this invention to provide a process for producing monoisocyanates and diisocyanates in a safe, non-toxic, easily effected and inexpensive reaction from readily available starting materials.

Other objects of this invention will be readily observed from the following description.

According to the present invention, the above objects are accomplished by heating and pyrolyzing a monocarbamate ester having the structure

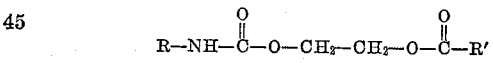

wherein R is an alkyl or cycloalkyl radical and R' is a lower alkyl radical, or by pyrolyzing a dicarbamate ester having the structure

wherein R" is an alkylene or cycloalkylene radical and R' is a lower alkyl radical. The monocarbamate esters produce monoisocyanates of the structure R—N=C=O, whereas the dicarbamate esters produce diisocyanates of the structure O=C=N—R"—N=C=O, R and R" having the significance described above.

While the size of the aliphatic nucleus upon which the carbamate ester groups are attached and indicated as R or R" in structure above presented, is not basically limited to any specific alkyl, alkylene, cycloalkyl or cycloalkylene group, it has been found that better yields and improved results are secured if the atomic weight of the said R or R" group is such that the molecular weight of the urethane ester is less than about 400. Urethane esters, or diesters having a molecular weight in excess of about 400 have been found to yield isocyanates in sharply reduced yields. It is believed that one of the principal reasons for decreased yields from such higher molecular weight starting materials is due to the irreversible polymerization of the isocyanate as it is produced.

For the most desirable yields and for convenience in carrying out this process, it is preferred that the R groups contain less than about 12 carbon atoms in the monocarbamate esters and R″ contains about 6 or less carbon atoms in the dicarbamate esters.

The carbamate esters employed in the present invention are readily obtained by known methods. Principal among these methods is the reaction of ethylene carbonate with a primary alkyl or cycloalkyl monoamine or diamine, depending on whether monoisocyanate or diisocyanates are to be formed.

The residue of the amine is indicated by the R—NH— or —NH—R″—NH— group described above. The resulting hydroxyethyl carbamates produced in the above reaction are then esterified through the hydroxyl groups with a lower alkyl carboxylic acid, or the acid anhydrides or acid chlorides of such acids. Preferably, acids having 2 to 4 carbon atoms are employed which will, with these preferred acids, make the R′ groups indicated in the structure shown above contain from 1 to 3 carbon atoms.

The preparation of the hydroxyurethanes is suitably carried out by reacting the amine and the ethylene carbonate, preferably in the presence of a solvent or mixture of solvents with or without a catalyst. Water and aromatic hydrocarbons such as benzene, toluene etc. are suitable solvents, the reaction being carried out at temperatures of about 50° C. However, where highly volatile amines are employed, lower temperatures are more desirable. Preferably the temperatures will be in the range of 0° C. to about 60° C. The reaction is somewhat exothermic and means for regulating the reaction temperature and removing the exothermic heat is desirably employed, either by external or internal cooling means. The hydroxyurethane produced in the reaction is preferably purified by recrystallization from the reaction solvent, if such be employed, or by distillation or other suitable means to remove unreacted amine where the reaction is not carried out to completion.

If desired, the esterification can be carried out without purification of the above product. The esterification reaction readily proceeds on the admixing of a stoichiometric amount of the lower alkyl carboxylic acid, or its anhydride or chloride i.e. one mole of the acylation agent per mole of hydroxyl of the hydroxyurethane. Temperatures between 0–100° C. are satisfactory for this reaction and catalysts are not generally necessary. When employing the acid chloride as the acylation agent, an acid-binding agent such as a base is added to the reaction to take up the by-product acid produced in the reaction.

A particularly desirable embodiment of this invention is in the formation in situ of the carbamate ester and immediately conducting the pyrolysis. Thus, in effect, it is possible to form the isocyanates by one reaction scheme, i.e. adding the amine and ethylene carbonate together at a low temperature, permitting the reaction to go to completion, esterifying the hydroxyurethane to form the carbamate ester and then raising the temperature to the point where decomposition of the carbamate ester into isocyanate and glycol esters begins, and separating the glycol ester and isocyanate produced.

The pyrolysis step of the present invention provides a simple, safe reaction which offers the advantages of improved yields and reduced times of reaction, even over the process disclosed in the above mentioned copending application. The reaction proceeds as follows

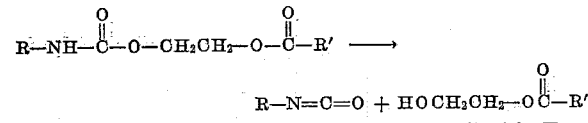

wherein R and R′ have the significance described in Formula I above.

Esterification of these hydroxyl groups has been found to eliminate the competing reactions which somewhat limited the yields in the process of our copending application, i.e. it prevents the reformation of amine and ethylene glycol where the amine might react with isocyanate to form the urea or the carbamate directly forms a polyurea both of which reduce yields. The benefits of this process are even more significant when producing diisocyanates from the dicarbamate esters. Whereas heretofore the attempted production of diisocyanates from dihydroxy urethanes was unsuccessful because of the formation of polyureas, the acylation of the hydroxy group permitted the formation of diisocyanates in this pyrolysis reaction.

The pyrolysis reaction is carried out by heating the carbamate ester to a temperature sufficient to initiate the decomposition of the carbamate ester or diester into the corresponding isocyanate and glycol ester, but below a temperature causing decomposition or polymerization of the isocyanate formed. Preferably, the temperature should be at least sufficient to vaporize substantially all of the isocyanate formed so as to facilitate the removal of the isocyanate product and prevent recombination thereof with the glycol ester. In this case, the isocyanate-containing vapors are preferably chilled to prevent any polymerization and/or recombination with any glycol ester appearing in the distillate although other methods of inhibiting the recombination reaction such as by the use of inhibitors against the reaction can be employed if desired. We particularly prefer the method of chilling the distillate if the glycol is also distilled over to a temperature low enough to prevent the recombination reaction and then separating the glycol ester from the isocyanate by washing or extratcion.

In carrying out this pyrolysis of this invention, temperatures between about 100° C. to 300° C. have given good results, depending to some extent on the pressure employed. Temperatures in excess of about 300° C. are undesirable from the standpoint of product yield and purity as well as from a control standpoint. Generally, it is desirable to employ subatmospheric pressures in the reaction, thereby avoiding such excessively high temperatures which may cause polymerization and decomposition of the isocyanate while at the same time facilitating the separating of the isocyanate vapors from the reaction mass. For this purpose pressures below about 100 mm. Hg are preferred. Particularly good results are secured in this process when pressures of about 25 mm. Hg and below are employed with temperatures of about 150° C. to 275° C.

If desired, the pyrolysis reaction can be materially hastened by the use of basic catalysts, such as those forming aqueous solutions having a pH of 8.0 or higher. Particularly desirable basic compounds are the alkali metal and alkaline earth metal compounds, preferably the oxides, hydroxides, carbonates and the like, of alkali metals and alkaline earth metals. While tertiary amines can also be used generally only fair yields of the isocyanate are obtained except at the higher pyrolysis temperatures which could lead to decomposition or polymerization of the isocyanates.

It is generally necessary to add only enough of these compounds to the extent of 1 to 10% by weight of the reaction mass. However, the use of such catalysts are not necessary for the practice of the invention for the pyrolysis reaction readily proceeds without their use.

As heretofore stated the isocyanate produced must be separated from the glycol ester to prevent reformation of the hydroxyurethane and formation of polyurethanes. Preferably this is accomplished by distilling overhead the isocyanate vapors and condensing the vapors. In most instances, however, some glycol ester will be distilled over with the isocyanate, particularly where the isocyanate vaporizes at about the same temperature as the glycol ester. If desired, the entire reaction mass can be decomposed and all the glycol ester and isocyanate can be distilled over. In such instances it is desired that the vapors be removed and immediately chilled, either in a condenser attached to the top of the column in which the pyrolysis is taking place, or in a Dry Ice trap or the like, so as to prevent the recombination of the isocyanate and the glycol ester and the formation of urethanes. The chilled distillate is dissolved in a water immiscible solvent inert to the isocyanate such as an alkyl ether, e.g., diethyl ether or a hydrocarbon such as petroleum ether. The distillate solution is then washed with water. Several washings or extractions with water have been found to extract substantially all of the glycol ester and prevent recombination later in the work-up of the isocyanate.

Separation of the organic layer of these washings or extractions, and drying, preferably with a desiccant such as $MgSO_4$ provides after distillation or crystallization, an isocyanate product in relatively pure form. It is obvious that other separation and recovery procedures such as fractional distillation, selective crystallization or absorption techniques well known to those skilled in the art can also be employed, and the above descriptions of specific separation and recovery steps are not to be construed as limiting the invention.

When the process is conducted within the preferred limits as hereinbefore set forth, yields of 70 to 90 percent are easily obtained, particularly if the interfering by-product forming reactions of the pyrolysis step are avoided or minimized. The isocyanates secured thereby are of good purity generally having sharp melting points within a degree or two. For laboratory analysis, the yield of isocyanate can be determined accurately by taking the organic phase of the washing step, adding an amine to form the urea which is insoluble in the ether and can be filtered off and weighed to give a weight of urea from which the yield of isocyanate can be calculated. For practical applications, however, it is desired to secure the isocyanate in pure form from the glycol-free solution which can be done by fractional distillation or crystallization techniques depending principally on the particular isocyanate produced, its boiling point and solubility characteristics, and the particular recovery method employed.

The following examples are illustrative of this invention:

Example I

A mixture of 1.50 moles (132 grams) of ethylene carbonate and 1.51 moles (150 grams) of cyclohexylamine was heated with stirring during a 40-minute period. Cooling water was employed to maintain the temperature of the exothermic reaction between 50° and 55° C. The reaction mixture was stirred for 5 additional hours at 45° to 55° C. and allowed to stand overnight. After recrystallization from a mixture and 250 ml. of benzene and 1000 ml. of cyclohexane, 264.5 g. of 2-hydroxyethyl cyclohexanecarbamate M.P. 64° to 66° C., was obtained. 0.5 mole (93.5 grams) of the 2-hydroxyethyl cyclohexanecarbamate was added to a mixture of: 55 ml. of 98.4% acetic anhydride, 1.1 ml. of glacial acetic acid, and 100 ml. of benzene. The mixture was heated under reflux for 21 hours, allowed to cool and diluted with 500 ml. of cyclohexane. A small amount of activated charcoal was added, and the mixture heated to boiling, filtered and cooled to 15° C. The crystals formed were filtered off and dried overnight in a circulating air oven at 60° C. A yield of 99.3 g., corresponding to 87% of the theoretical, of 2-acetoxyethyl cyclohexanecarbamate M.P. 82° to 84° C. was obtained. 18.3 g. of the 2-acetoxyethyl cyclohexanecarbamate and 0.60 gm. of calcium oxide were placed in a flask equipped with a thermometer and a fractionating column. Pyrolysis was carried out by heating the contents of the flask to 165°–180° C. at a pressure of 6–7 mm. The distillate was cooled rapidly below 0° C.; it was dissolved while still cold in a mixture of 50 ml. of ether and 50 ml. of 30°–60° C., petroleum ether. The dissolved distillate was washed with several small portions of cold water totaling 50 ml., and the organic layer containing the isocyanate was dried with $MgSO_4$.

Cyclohexyl isocyanate is a volatile and highly reactive liquid and, therefore, the yield could not be easily or accurately determined by direct measurement after isolation. The yield was therefore determined in the following manner:

8 gm. of cyclohexylamine was added to the distillate product to form sym-dicyclohexyl-urea according to the equation:

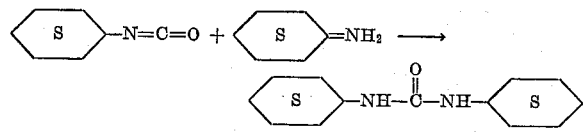

The solution was allowed to stand overnight and the precipitated sym-dicyclohexylurea, M.P. 229°–231° C., was filtered off, washed with ether and dried. The urea recovered weighed 10.54 gm. The yield of cyclohexylisocyanate therefore was:

$$\frac{10.54 \times M.W.\ \text{isocyanate}\ (125)}{M.W.\ \text{urea}\ (224)} = 5.9\ \text{gm.}\ (59\%)$$

The filtrate from the urea precipitation was washed with HCl to neutralize any excess of cyclohexylamine, dried over $MgSO_4$ and the solvent evaporated off. 2.90 gm. of 2-acetoxyethyl cyclohexane carbamate was recovered. Isocyanate yield was 70% based on starting material consumed.

The use of a basic catalyst having a pH above 8.0, such as calcium oxide shown above, or tribenzylamine and calcium carbonate, is not essential to the pyrolysis step, but does provide an improved yield in some instances.

Example II 91.5 gms. of 2-acetoxyethyl cyclohexanecarbamate prepared as in Example I and 2.9 gms. of calcium oxide were heated together to a temperature of 182–200° C. at 18–20 mm. The distillate was cooled and then suspended in 600 ml. of 30°–60° C. petroleum ether. The resulting slurry was filtered. The solid on the filter, identified as 2-acetoxyethylcyclohexanecarbamate, weighed 43.8 gms. The filtrate and the washings were combined and extracted with several portions of water amounting to 175 ml. The petroleum ether layer was dried over $MgSO_4$ and fractionally distilled through a Vigreux column. 19.4 gms. of cyclohexyl isocyanate, B.P. 66.5–68.5° C./21 mm. was obtained. An additional 1.3 gm. of 2 acetoxyethyl cyclohexanecarbamate was recovered from the distillation residue. The yield of cyclohexyl isocyanate therefore based on starting material consumed was 76%.

Example III

A mixture of 33.8 gms. of 2-acetoxyethyl butyl-carbamate and 4.8 gms. of tribenzylamine were heated to 190–220° C. at a pressure of 45 mm. The distillate was cooled and dissolved in a mixture of 35 ml. of diethyl ether and 50 ml. of 30°–60° C. petroleum ether. The solution was washed with five 10 ml. portions of water and dried over $MgSO_4$.

To determine the yield of butyl isocyanate, 16 gms. of aniline was added to the dried solution and heat was applied to warm the solution slightly. The solution was refrigerated until crystallization was complete. After filtration, the precipitate of N-butyl-N'-phenylurea, M.P. 127–129° C., weighing 9.80 gms. was obtained. An additional 14.8 gms. of 2-acetoxyethyl butylcarbamate B.P. 150–154° C./6 mm. was recovered from the filtrate. The yield of butyl isocyanate, based on starting material consumed, was 57%.

Example IV 18.8 gms. of bis(2-acetoxyethyl) 1,6-hexanedicarbamate and 2.8 gms. of tribenzylamine were heated together at an initial pressure of 6 mm. Distillation began at 215° C. and ended at 260° C. The distillate was cooled, dissolved in 60 ml. of 30° C.–60° C. petroleum ether and washed with five 10 ml. portions of water. The aqueous washings were extracted with two 25 ml. portions of petroleum ether. The combined organic layers were dried over MgSO$_4$.

To determine the yield of isocyanate 7.5 gms. of butylamine were added. The precipitate formed was recrystallized from dimethylforamide to increase purity. The yield of hexamethylene bis-(butylurea) (M.W. 314), M.P. 194–195.5° C., was 6.29 gms. The yield of hexamethylene diisocyanate (M.W. 168) therefore was:

$$6.29 \times \frac{168}{314} = 3.36 \text{ gms. or } 40\%$$

The urea obtained was identical to a sample prepared from authentic hexamethylene diisocyanate. Analysis for nitrogen content agreed with the theoretical value.

The procedure of Example IV was repeated omitting the tribenzylamine catalyst. Pyrolysis occurred at 220–260° C./0.3–1.5 mm. The yield of hexamethylene diisocyanate, as determined by the amount of hexamethylene bis-(butylurea) produced on the addition of butylamine to the product was 2.67 gm. or 17%.

What is claimed is:

1. A method for the preparation of isocyanate derivatives of saturated hydrocarbons including the steps of heating to a temperature between about 100° and 300° C. and under a pressure below about 100 mm. Hg. a member selected from the group consisting of monocarbamate esters having the general formula:

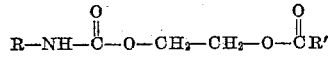

and a dicarbamate ester having the general formula:

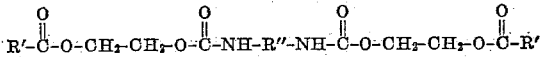

wherein R is a member selected from the group consisting of alkyl and cycloalkyl radicals, R' is a lower alkyl radical and R" is a member selected from the group consisting of alkylene and cycloalkylene radicals, said members having a molecular weight below about 400 and isolating the isocyanate derivative of the saturated hydrocarbon.

2. A method for the preparation of isocyanate derivatives of saturated hydrocarbons including the steps of heating at about 150° to 275° C. under a pressure below about 100 mm. Hg a monocarbamate ester having the general formula:

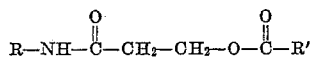

wherein R is a member selected from the group consisting of alkyl and cycloalkyl radicals having less than about 12 carbon atoms and R' is an alkyl group having from 1 to 3 carbon atoms.

3. A method for the preparation of isocyanate derivatives of saturated hydrocarbons including the steps of heating at about 150° to 275° C. under a pressure below about 100 mm. Hg a dicarbamate ester having the general formula:

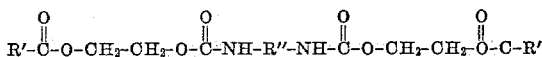

wherein R' is an alkyl radical having from 1 to 3 carbon atoms and R" is a member selected from the group consisting of alkylene and cycloalkylene radicals having up to and including 6 carbon atoms.

4. The method of claim 2 wherein a basic catalyst is employed.

5. The method of claim 3 wherein a basic catalyst is employed.

6. A method for the preparation of cyclohexyl isocyanate having as the essential step the heating at about 150° to 275° C. under a pressure below about 100 mm. Hg 2-acetoxyethyl cyclohexanecarbamate.

7. A method for the preparation of butyl isocyanate having as the essential step the heating at about 150° to 275° C. under a pressure below about 100 mm. Hg 2-acetoxyethyl butylcarbamate.

8. A method for the preparation of hexamethylene diisocyanate having as the essential step the heating at about 150° to 270° C. under a pressure below about 100 mm. Hg bis(2-acetoxyethyl)1,6-hexanedicarbamate.

References Cited in the file of this patent

UNITED STATES PATENTS

| | | |
|---|---|---|
| 2,409,712 | Schweitzer | Oct. 22, 1946 |
| 2,713,591 | Bortnick | July 19, 1955 |

OTHER REFERENCES

Saunders et al.: Chem. Rev. 43 (1948), page 206. (Copy in Scientific Library.)

Petersen: Ann. 562 (1949), page 208. (Copy in Scientific Library.)

UNITED STATES PATENT OFFICE

CERTIFICATE OF CORRECTION

Patent No. 3,054,819                 September 18, 1962

Robert Barclay, Jr., et al.

It is hereby certified that error appears in the above numbered patent requiring correction and that the said Letters Patent should read as corrected below.

Column 2, line 3, for "subatmosphere" read -- subatmospheric --; lines 20 to 22, the formula should appear as shown below instead of as in the patent:

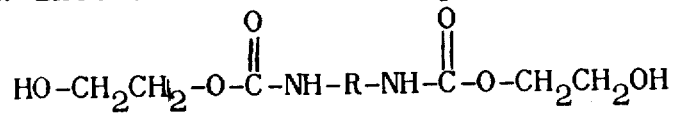

Signed and sealed this 23rd day of April 1963.

(SEAL)
Attest:

ERNEST W. SWIDER
Attesting Officer

DAVID L. LADD
Commissioner of Patents